Nov. 3, 1964   W. SCHROEDER   3,155,006
ARBOR SUPPORT BUSHING FOR A MACHINE TOOL
Filed June 18, 1962

INVENTOR.
WALTER SCHROEDER
BY
ATTORNEYS

United States Patent Office 3,155,006
Patented Nov. 3, 1964

3,155,006
ARBOR SUPPORT BUSHING FOR A MACHINE TOOL
Walter Schroeder, Cincinnati, Ohio, assignor to The Cincinnati Milling Machine Co., Cincinnati, Ohio, a corporation of Ohio
Filed June 18, 1962, Ser. No. 203,371
2 Claims. (Cl. 90—20.5)

This invention relates to an arbor support bushing especially adapted for use in a machine tool.

Anti-friction arbor support bushings are frequently used in pendent type support members which are fixed to milling machine overarms and which maintain rotating arbors in alignment with a driving spindle. These bushings are composed of a sleeve supported in a retaining bushing by roller bearings. The retaining bushing is fitted in the support member and clamped in position. In this type of arbor bushing, it is desirable to prevent the sleeve from shifting axially out of the retaining bushing and bearings. This is commonly done by providing an annular groove around the sleeve and securing a pin or screw in the retaining bushing with an end extending into the groove. While the pins of these bushings are not intended to contact the sides of the groove, they often do as a result of thermal changes in machine parts and as a result of inadvertent misalignments in overarm, arbor, and arbor support set-up. Therefore such an arrangement has been found to be unsatisfactory in high speed use and for operations requiring prolonged arbor rotation where the drag of the pins or screws produces excessive heating and wear of bushing components. Therefore it is the object of this invention to provide an anti-friction arbor bushing assembly which eliminates the disadvantages of bushings using the fixed pin and groove combination to axially restrain a sleeve within the bushing assembly.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, this invention utilizes anti-friction means to hold a sleeve in the retaining bushing of an arbor bushing assembly. A complete understanding of the invention can be obtained from the following detailed description in which reference is made to the attached drawings wherein.

Figure 1:
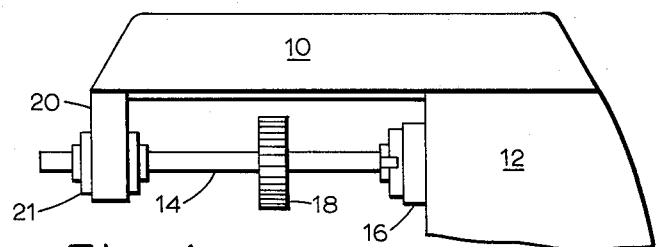
FIG. 1 is a partial side elevation of a milling machine.

The milling machine of FIG. 1 has an overarm 10 extending horizontally from the top of a column 12. An arbor 14 extends from a spindle 16 parallel to and below the overarm 10. A cutting tool 18 is fixed on the arbor 14 between the spindle 16 and an arbor support 20 which is fixed to and hangs downward from the end of the overarm 10. The spindle 16 rotates the arbor 14 and cutter 18 to remove metal from workpieces which are carried into contact with the cutter by a table mechanism (not shown). It is the function of the overarm 10 and support 20 to maintain the arbor in axial alignment with the spindle 16 at this time.

Figure 2:
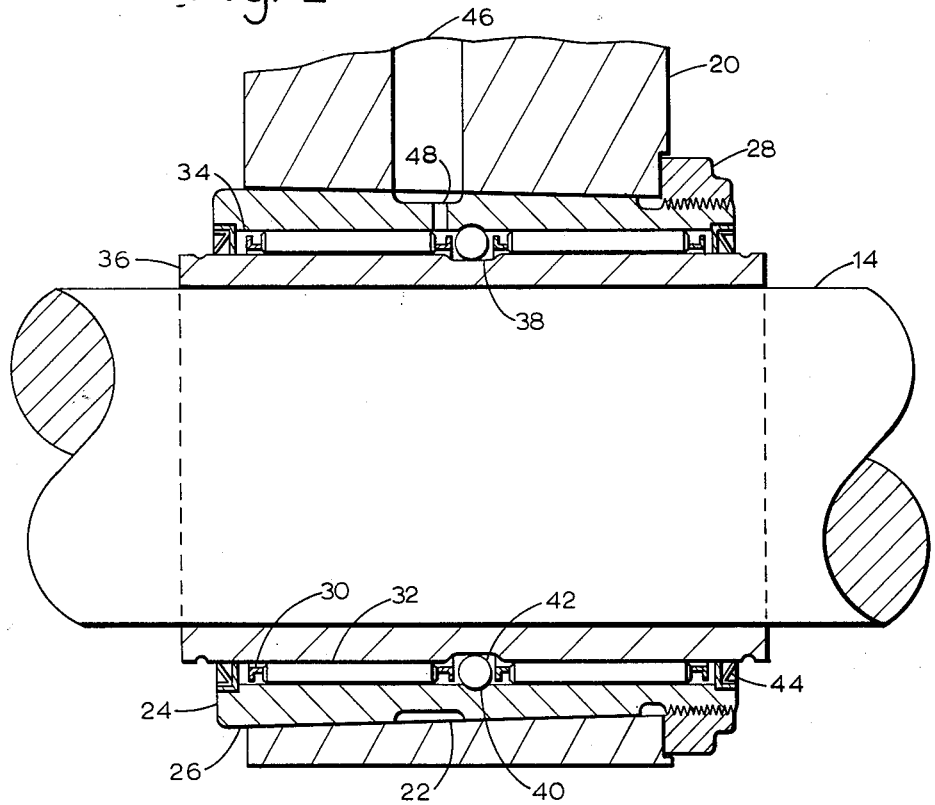
FIG. 2 is a longitudinal cross section of an anti-friction arbor support bushing assembly.

A bushing assembly 21, shown in section in FIG. 2, is provided in the support member 20 to hold the end of the arbor 14 in the proper alignment while allowing it to be freely rotated. The arbor support 20 has a slightly tapered bore 22 therethrough. A retaining bushing 24 having a mating tapered external surface 26 is received in the bore 22 and held in place by a nut 28 which is threadedly engaged on an end of the retaining bushing 24 and turned until it bears tightly against the side of the support 20. The nut 28 operates to pull the mating tapered surfaces 22, 26 together and thus to hold the retaining bushing 24 fixed in the support member 20. A set of two identical roller bearing units of the needle bearing type are received in the bushing 24. Each of the bearings is comprised of a roller cage 30 and a set of slender rollers 32 received around a cylindrical bore 34 through the retaining bushing 24. A cylindrical sleeve 36 is rotatably received through the retaining bushing 24, being supported in and held concentric with the bushing 24 by the needle bearing assembiles. The bushing 24 provides the outer race for the needle bearings while the sleeve 36 provides the inner race. The sleeve 36 is adapted to receive the arbor 14 and to rotate with it. The sleeve 36 has an annular groove 38 which extends around its outer periphery and is located opposite a ball track groove 40 between the needle bearing assemblies that is narrower than the groove 38. A set of anti-friction balls 42 are received in the peripheral space between the groove 38 and track 40 and are retained therein since there is reduced clearance space on either side thereof. The balls 42 are inserted prior to the needle bearings while the sleeve 36 is eccentric in the bushing 24 as in a Conrad or non-filling notch type of bearing well known in the bearing art. The balls 42 then do not completely fill the annular space. The combination of the balls 42, groove 38, and track 40 prevent the sleeve 36 from moving axially within the bushing 24 except for a small amount of movement permitted by the difference in width between the grooves 38, 40. The sleeve 36 will rotate freely in the bushing 24, even with an end thrust acting thereon. Annular seals 44 are received around the sleeve 36, inside the bushing 24, to exclude dirt from the bearings. A passage 46 is provided to supply lubricant from a reservoir (not shown) in the support 20 to an orifice 48 which admits the lubricant to the bearings in a controlled amount.

It can be seen from the foregoing description that the balls 42 will act to prevent the removal of the sleeve 36 from the bushing 24. The balls 42 will substantially prevent frictional drag between the sleeve 36 and bushing 24 and will distribute axial load among the plurality of balls. Thus the use of the described combination will reduce the occurrence of wear to the sleeve 36. The entire bushing assembly will consequently be maintained at a lower operating temperature than a bushing having a screw or pin dragging in a groove to provide the axial restraint on a rotating sleeve. Furthermore, since the wear of the sleeve 36 is reduced, fewer metal particles from the sleeve 36 will be present to contaminate the needle bearings and reduce their effectiveness. As shown, the balls 42 may be placed conveniently at an axial location between the roller bearing units. Each end of the sleeve 36 then is closely supported by the rollers 32. This is important since in many applications a load is applied to the arbor 14 on each side of the support 20 and the nearer to the load that the bearings are located, the more effective they will be.

What is claimed is:

1. In a machine tool having a rotatable arbor extending through a supporting member, an arbor bushing comprising in combination:

(a) a tapered bore through said supporting member, (b) a bushing having a tapered external surface and a cylindrical bore therethrough having an annular groove therearound, (c) means to pull said bushing axially into said bore for mating contact therebetween, (d) a sleeve received through said cylindrical bore and having an annular groove around the outer surface thereof, said bushing and sleeve annular groove being of different widths, (e) anti-friction means to hold said sleeve rotatably concentric within said retaining member bore, and (f) a plurality of balls receiving between said annular grooves for free movement therearound relative to said bushing and sleeve whereby said balls limit axial movement of said sleeve in said bushing in accordance with the difference in width of said annular grooves.

2. In a machine tool having a rotatable arbor extending through a supporting member, an arbor bushing comprising in combination:

(a) a tapered bore through said supporting member, (b) a bushing having a tapered external surface and a cylindrical bore therethrough having an annular groove therearound, (c) means to pull said bushing axially into said bore for mating contact therewith, (d) a sleeve received through said cylindrical bore and having an annular groove around the outer surface thereof, said bushing and sleeve annular grooves being of different widths, (e) a pair of roller bearings received between said bushing and sleeve and spaced to include said annular grooves therebetween, and (f) a plurality of balls received between said annular grooves for free movement therearound relative to said bushing and sleeve whereby said balls limit axial movement of said sleeve in said bushing in accordance with the difference in width of said annular grooves.

References Cited in the file of this patent
UNITED STATES PATENTS

| | | |
|---|---|---|
| 1,174,815 | Briggs | Mar. 7, 1916 |
| 1,975,912 | Vancil | Oct. 9, 1934 |
| 1,988,326 | Moo | Jan. 15, 1935 |
| 2,040,489 | Large | May 12, 1936 |
| 2,907,353 | Van Deventer | Oct. 6, 1959 |